United States Patent
Fujimoto (10) Patent No.: US 12,112,061 B2
(45) Date of Patent: Oct. 8, 2024

(54) HOST APPARATUS AND MEMORY SYSTEM

(71) Applicant: Kioxia Corporation, Tokyo (JP)

(72) Inventor: Akihisa Fujimoto, Yamato (JP)

(73) Assignee: Kioxia Corporation, Tokyo (JP)

(*) Notice: Subject to any disclaimer, the term of this patent is extended or adjusted under 35 U.S.C. 154(b) by 28 days.

(21) Appl. No.: 18/184,738

(22) Filed: Mar. 16, 2023

(65) Prior Publication Data
US 2023/0221887 A1    Jul. 13, 2023

Related U.S. Application Data (63) Continuation of application No. PCT/JP2020/043420, filed on Nov. 20, 2020.

(30) Foreign Application Priority Data

Sep. 17, 2020    (JP) .................. 2020-156163

(51) Int. Cl.
*G06F 3/06*    (2006.01)

(52) U.S. Cl.
CPC .......... *G06F 3/0658* (2013.01); *G06F 3/0607* (2013.01); *G06F 3/0679* (2013.01)

(58) Field of Classification Search
CPC ..... G06F 3/0658; G06F 3/0607; G06F 3/0679
See application file for complete search history.

(56) References Cited

U.S. PATENT DOCUMENTS

| | | | | |
|---|---|---|---|---|
| 5,748,426 A | * | 5/1998 | Bedingfield | H05K 7/1457 361/58 |
| 5,979,759 A | * | 11/1999 | Ohta | G06K 7/0013 235/487 |
| 7,664,902 B1 | | 2/2010 | Chow et al. | |
| 2004/0040043 A1 | * | 2/2004 | Heo | H04N 21/4432 710/22 |
| 2020/0034317 A1 | | 1/2020 | Kato et al. | |
| 2020/0090020 A1 | | 3/2020 | Fujimoto et al. | |
| 2022/0276646 A1 | * | 9/2022 | Kumath | H01S 5/06825 |

FOREIGN PATENT DOCUMENTS

| | | |
|---|---|---|
| TW | 201903557 A | 1/2019 |
| WO | WO 2018/186457 A1 | 10/2018 |

OTHER PUBLICATIONS

"SD Express (SD7.x) Host Implementation Guideline" Design Guide, SD Card Association, May 2020, pp. 1-21.

\* cited by examiner

*Primary Examiner* — Prasith Thammavong
(74) *Attorney, Agent, or Firm* — Oblon, McClelland, Maier & Neustadt, L.L.P.

(57) ABSTRACT

According to one embodiment, while a memory card is in a second operation mode, a host controller monitors a reset signal for the second operation mode and detects that an error occurs in the second operation mode in the condition that a period of time during which both a card presence signal and the reset signal are asserted continues for a first period of time or longer. The host controller generates a first interrupt signal for starting a first driver in response to the detection of the occurrence of the error. The first driver, when started by the first interrupt signal, changes the operation mode of the memory card from the second operation mode to a first operation mode by controlling the host controller.

10 Claims, 5 Drawing Sheets

HOST APPARATUS AND MEMORY SYSTEM

CROSS-REFERENCE TO RELATED APPLICATIONS

This application is a Continuation Application of PCT Application No. PCT/JP2020/043420, filed Nov. 20, 2020 and based upon and claiming the benefit of priority from Japanese Patent Application No. 2020-156163, filed Sep. 17, 2020, the entire contents of all of which are incorporated herein by reference.

FIELD

Embodiments described herein relate generally to a host apparatus and a memory system which control a memory card.

BACKGROUND

In recent years, a variety of memory cards have become widely used. Memory cards are used in various host apparatuses such as personal computers, mobile communication devices, game consoles, cameras, in-vehicle equipment and the like.

As an example of the memory card, an SD (registered trademark) card is known. More recently, new memory cards which support two types of operation modes have been developed.

DETAILED DESCRIPTION

Various embodiments will be described hereinafter with reference to the accompanying drawings.

In general, according to one embodiment, a host apparatus is capable of controlling a memory card. The memory card supports a first operation mode of communicating with the host apparatus via a first interface and a second operation mode of communicating with the host apparatus via a second interface different from the first interface. The host apparatus comprises a host controller, a power supply circuit and a communication control circuit. The host controller controls the memory card via the first interface under a control of a first driver, the first driver being a program executed by a processor in the host device. The power supply circuit is capable of supplying to the memory card a first power supply voltage necessary for both the first operation mode and the second operation mode, and a second power supply voltage lower than the first power supply voltage and necessary only for the second operation mode. The communication control circuit initiates communication with the memory card via the second interface under a control of a second driver, in response to an assertion of a card presence signal, the second driver being a program executed by the processor. When the memory card supports the second operation mode, the host controller turns on the second power supply voltage while the first power supply voltage is on and asserts the card presence signal directed toward the communication control circuit, such that an operation mode of the memory card is changed from the first operation mode to the second operation mode. While the operation mode of the memory card is in the second operation mode, the host controller monitors a reset signal for the second operation mode output from the communication control circuit. The host controller detects that an error occurs in the second operation mode when a period of time during which both the card presence signal and the reset signal for the second operation mode are asserted continues for a first period of time or longer, and generate a first interrupt signal for starting the first driver in response to detection of occurrence of the error. The first driver is configured to be started by the first interrupt signal, and to change the operation mode of the memory card from the second operation mode to the first operation mode by controlling the host controller.

Figure 1:
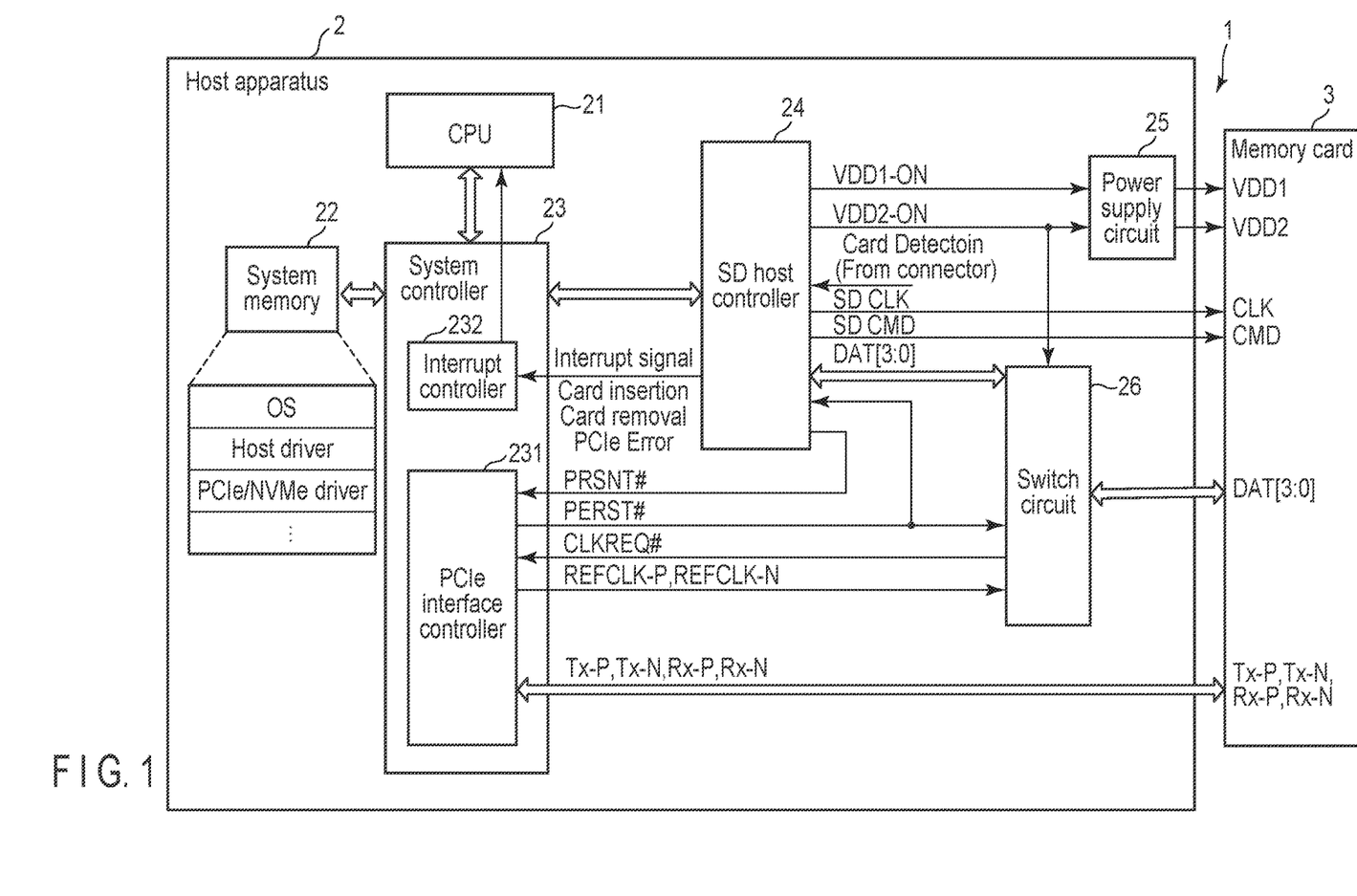
FIG. 1 is a block diagram illustrating a configuration example of a memory system which includes a host apparatus according to an embodiment.

FIG. 1 is a block diagram illustrating a configuration example of a memory system 1 that includes a host apparatus 2 according to the embodiment.

The memory system 1 includes the host apparatus 2 and a memory card 3. The memory card 3 is a removable storage device which is capable of being inserted to a connector in the host apparatus 2. The memory card 3 includes, for example, a nonvolatile memory and a controller which controls the nonvolatile memory. The memory card 3 is configured to write data to the nonvolatile memory in the memory card 3 and to read data from the nonvolatile memory.

The memory card 3 supports two types of operation modes including: a first operation mode of communicating with the host apparatus 2 via a first interface; and a second operation mode of communicating with the host apparatus 2 via a second interface different from the first interface. In other words, the memory card 3 is configured to operate in each of the first operation mode and the second operation mode.

The first interface is, for example, an existing interface for memory cards. The second interface is, for example, a general-purpose interface such as PCI Express (PCIe) (registered trademark).

Although it is not particularly limited, the memory card 3 may be realized as, for example, an SD Express card (registered trademark). When the memory card 3 is realized as an SD Express card, the SD interface, which is an existing interface for SD cards, is used as the first interface and the PCIe interface is used as the second interface.

SD Express cards support two type of operation modes including an SD mode and a PCIe/NVMe mode. The SD mode is an operation mode of communicating with the host apparatus 2 via the SD interface. The PCIe/NVMe mode is an operation mode of communicating with the host apparatus 2 via the PCIe interface.

The host apparatus 2 includes both the first interface and the second interface. The host apparatus 2 can control the memory card 3 using the first operation mode and also can control the memory card 3 using the second operation mode we well.

The following is an explanation of a configuration of the host apparatus 2 by taking an example case where the memory card 3 is an SD Express card.

The host apparatus 2 is an information processing apparatus which can be connected to the memory card 3. Examples of the host apparatus 2 are a personal computer, server computer, mobile terminal, in-vehicle equipment and the like. The host apparatus 2 includes a CPU 21, a system memory 22, a system controller 23, an SD host controller 24, a power supply circuit 25 and a switch circuit 26.

The CPU 21 is a processor configured to control the system controller 23 and the SD host controller 24. The CPU 21 accesses the system memory 22 via the system controller 23. Further, the CPU 21 controls the SD host controller 24 via the system controller 23. The interface between the system controller 23 and the SD host controller 24 is not particularly limited, but the SD host controller 24 is connected to the system controller 23 via a PCIe interface, for example. The system controller 23 includes a PCIe interface controller 231 and an interrupt controller 232 and the like.

The CPU 21 is a processor configured to execute control programs (an operating system (OS), host driver, PCIe/NVM Express (NVMe) (registered trademark) drivers and the like) stored in the system memory 22. The host driver is a program (software driver) executed by the CPU 21. The CPU 21 controls the operation of the SD host controller 24 by executing the host driver. The PCIe/NVMe drivers are programs (software drivers) executed by the CPU 21. The CPU 21 controls the operation of the PCIe interface controller 231 by executing the PCIe driver.

In the following descriptions, the operations carried out by the CPU 21 by executing the host driver and the PCIe/NVMe drivers will be described as the operations executed by the host driver and the PCIe/NVMe drivers.

The system memory 22 is the main memory provided in the host apparatus 2. The system memory 22 is realized by a dynamic RAM (DRAM), for example.

The power supply circuit 25 supplies two types of power voltages, namely, VDD1 (3.3V), which is the first power voltage and VDD2 (1.8V), which is the second power voltage, to the memory card 3 inserted into the connector of the host device 2 under the control of the SD host controller 24. VDD1 (3.3V) is a power supply voltage necessary for the memory card 3 to operate in the SD mode. On the other hand, in order for the memory card 3 to operate in the PCIe/NVMe mode, it is necessary to supply both VDD1 (3.3V) and VDD2 (1.8V) to the memory card 3.

The power supply circuit 25 controls the on/off of the power supply voltage VDD1 in response to the first power supply voltage control signal VDD1-ON from the SD host controller 24. Further, the power supply circuit 25 controls the on/off of the power supply voltage VDD2 in response to the second power supply voltage control signal VDD2-ON from the SD host controller 24.

In more detail, the power supply circuit 25 turns on the first power supply voltage VDD1 when the first power control signal VDD1-ON is at a high level, whereas it turns off the first power supply voltage VDD1 when the first power control signal VDD1-ON is at a Low level. Further, the power supply circuit 25 turns on the second power supply voltage VDD2 when the second power control signal VDD2-ON is at high level, whereas it turns off the second power supply voltage VDD2 when the second power control signal VDD2-ON is at a low level.

In the memory card 3, the power supply voltage VDD1 is supplied to a VDD1 terminal, which is a power terminal of the memory card 3. The power supply voltage VDD2 is supplied to the VDD2 terminal, which is another power terminal of the memory card 3.

The SD host controller 24 is a host controller configured to control the memory card 3 via the first interface (in this case, the SD interface) under the control of the host driver. The SD interface includes a clock signal SD CLK, a SD command SD CMD and 4-bit data signals DAT [3:0]. In this embodiment, the SD host controller 24 communicates with the memory card 3 via the SD interface, and further executes, under the control of the host driver, processing of changing the operation mode of the memory card 3 from the SD mode to the PCIe/NVMe mode and processing of changing the operation mode of the memory card 3 from the PCIe/NVMe mode back to the SD mode.

Specifically, under the control of the host driver, the SD host controller 24 supplies the first power control signal VDD1-ON, which controls the on/off of the first power supply voltage VDD1, and the second power control signal VDD2-ON, which controls the on/off of the second power supply voltage VDD2, individually to the power supply circuit 25.

The SD host controller 24 first causes the memory card 3 to operate in the SD mode once by turning on the first power supply voltage VDD1 and supplying the clock signal SD CLK to the memory card 3. The clock signal SD CLK is used to synchronize the operation timing of the SD interface circuitry (not shown) in the memory card 3 with the operation timing of the SD host controller 24. The clock signal SD CLK is supplied to the clock CLK terminal of the memory card 3.

Further, the SD host controller 24 transmits a SD command SD CMD to the memory card 3. The SD command SD CMD is one of various commands to control the memory card 3 using the SD mode. For example, the SD commands SD CMDs includes, in addition to an I/O command such as a read/write command, CMD0, which is a reset command for the SD mode, CMD8, which is a command to check the functions supported by the memory card 3, and the like. The SD command SD CMD is supplied to the command CMD terminal of the memory card 3.

The SD host controller 24 executes the processing of transmitting the 4-bit data signal DAT [3:0] to the memory card 3 via the switch circuit 26 and the processing of receiving the 4-bit data signal DAT [3:0] from the memory card 3 via the switch circuit 26.

Further, the SD host controller 24 receives a card detection signal Card Detection from the connector (not shown) to which the memory card 3 can be inserted. The card detection signal Card Detection is a signal indicating that a memory card 3 is inserted to the connector and that the memory card 3 is extracted from the connector (to be referred to as "removal" hereinafter). When a memory card 3 is inserted to the connector, the connector outputs a card detection signal Card Detection having a predetermined voltage level which indicates that a memory card 3 is inserted to the connector. When a memory card 3 is removed from the connector, the connector outputs a card detection signal Card Detection having another predetermined voltage level which indicates that a memory card 3 is removed from the connector. The SD host controller 24 can detect insertion/removal of the memory card 3 based on changes in the voltage level of the card detection signal Card Detection.

The signal voltage level of the card detection signal Card Detection varies depending on the detection method of the memory card 3. For example, with used of a pull-up scheme, which pulls up the card detection signal Card Detection line, when a memory card 3 is inserted to the connector, the connector outputs a card detection signal Card Detection of a low level, which indicates that the memory card 3 is inserted to the connector. On the other hand, when a memory card 3 is removed from the connector, the connector outputs a card detection signal Card Detection of a high level, which indicates that the memory card 3 is removed from the connector.

Further, when a memory card 3 is inserted to the connector and the SD host controller 24 detects that the memory card 3 supports the PCIe/NVMe mode using the CMD8, the SD host controller 24 turns on the first power supply voltage VDD2 while the first power supply voltage VDD1 is on and asserts a card presence detection signal PRSNT #directed toward the PCIe interface controller 231, such that the operation mode of the memory card 3 is changed from the SD mode to the PCIe/NVMe mode. The card presence detection signal PRSNT #is a signal indicating that a memory card 3 which supports the PCIe/NVMe mode is connected to the host apparatus 2, or in other words, that a PCIe/NVMe device is connected to the PCIe interface controller 231. Note that asserting a signal means setting the voltage level of the signal to the active level. On the other hand, de-asserting a signal means setting the voltage level of the signal to the inactive level.

Since the card presence detection signal PRSNT #is a low active signal, when the card presence detection signal PRSNT #directed toward the PCIe interface controller 231 is asserted, the voltage of the card presence detection signal PRSNT #is set to a low level. The PCIe interface controller 231 is configured to initiate communication with the memory card 3 via the PCIe interface using the PCIe driver in response to the assertion of the card presence detection signal PRSNT #. In this manner, the operation mode of the memory card 3 is changed to the PCIe mode.

While the operation mode of the memory card 3 is in the PCIe/NVMe mode, the SD host controller 24 monitors a reset signal PERST #, which is one of sideband signals for PCIe interface, output from the PCIe interface controller 231 to the switch circuit 26. That is, the SD host controller 24 includes an input terminal for inputting the reset signal PERST #output from the PCIe interface controller 231 to the switch circuit 26. This input terminal is connected to a reset signal #line between the PCIe interface controller 231 and the switch circuit 26. The reset signal #is a reset signal for the PCIe/NVMe mode. The reset signal #is supplied from the PCIe interface controller 231 to the memory card 3 via the switch circuit 26. When the reset signal #is asserted, the PCIe interface circuit (not shown) contained in the memory card 3 is reset to its initial state (reset state). Further, when the reset signal #is de-asserted by the PCIe interface controller 231, the reset state of the PCIe interface circuit contained in the memory card 3 is released, thereby the PCIe interface circuit contained in the memory card 3 starts to operate.

The system controller 23 is connected to each of the CPU 21, the system memory 22 and the SD host controller 24. Further, the system controller 23 includes the PCIe interface controller 231 and the interrupt controller 232 described above.

The PCIe interface controller 231 is a communication control circuit that communicates with the memory card 3 via the PCIe interface under the control of the PCIe driver.

When the card presence detection signal #is asserted by the SD host controller 24, the PCIe interface controller 231 initiates communication with the memory card 3 via the PCIe interface. More specifically, when the card presence detection signal #is asserted, the PCIe/NVMe drivers are started and the PCIe interface controller 231 initiates the PCIe interface initialization process under the control of the PCIe driver. When the PCIe interface initialization process is completed, the NVMe driver initializes NVMe controller in the memory card 3. After completion of the initialization of the NVMe controller, application starts read/write access to the memory card 3 via the PCIe interface under the control of the PCIe/NVMe drivers.

The PCIe interface includes a group of signals, namely, two sideband signals (a reset signal #and a clock request signal CLKREQ #), differential reference clock signals REFCLK-P and REFCLK-N, differential transmission signals Tx-P and Tx-N, and differential receive signals Rx-P and Rx-N. The symbol #following the signal name indicates that the signal is a low active signal.

The reset signal PERST #is a reset signal for the PCIe/NVMe mode, as described above. The clock request signal CLKREQ #is a signal that requests the PCIe interface controller 231 to transmit the differential reference clock signals. The clock request signal CLKREQ #is supplied from the memory card 3 to the PCIe interface controller 231 via the switch circuit 26. The differential reference clock signals REFCLK-P and REFCLK-N can eliminate the need for a clock oscillator in the memory card 3, thus simplifying a configuration of a clock circuit in the memory card 3.

The two sideband signal lines (reset signal PERST #line and clock request signal CLKREQ #line) and the two reference clock signals REFCLK-P and REFCLK-N lines are connected to the DAT [3:0] terminal of the memory card 3 via the switch circuit 26.

The differential transmission signals Tx-P and Tx-N are used to transmit commands, data and the like from the PCIe interface controller 231 to the memory card 3. The differential receive signals Rx-P and Rx-N are used to transmit responses, data and the like from the memory card 3 to the PCIe interface controller 231.

Incidentally, while the operation mode of the memory card 3 is in the PCIe/NVMe mode, the operation of each of the memory card 3 and the PCIe interface controller 231 is controlled by the PCIe driver and NVMe protocol on PCIe interface is controlled by NVMe driver. It is preferable to use the standard PCIe/NVMe drivers for better compatibility and for avoiding new development. Customization of the PCIe/NVMe drivers will be hard work and then not expected.

Since the standard PCIe/NVMe drivers are software drivers independent of the host driver, the standard PCIe/NVMe drivers do not have any special functions to communicate with the host driver. Further, while the memory card 3 is in the PCIe/NVMe mode, the host driver is set to a sleep state so as not to consume the resources of the CPU 21.

Therefore, in an environment where the standard PCIe/NVMe drivers are used, when any errors occur in the PCIe/NVMe mode, the memory card 3 will freeze in the PCIe/NVMe mode, thereby making it impossible to use the memory card 3.

In this case, in order to change the operation mode of the memory card 3 from the PCIe/NVMe mode back to the SD mode, the user must either remove the memory card 3 once and re-insert it into the connector, or reboot the OS. Further, it is also necessary to retain somewhere the information indicating that an error occurred in the PCIe/NVMe mode, so as to be able to start-up the memory card 3 in the SD mode.

In this embodiment, even in an environment where the standard PCIe/NVMe drivers are being used, in order to be able to deal with errors that occur in the PCIe/NVMe mode, the occurrence of an error in the PCIe/NVMe mode is detected by the SD host controller 24. Then, in response to the detection of the occurrence of an error in the PCIe/NVMe mode, the SD host controller 24 generates an interrupt signal for starting the host driver. When the host driver is started by the CPU 21 due to the interrupt signal, the host driver executes a process of changing the operation mode of the memory card 3 from the PCIe/NVMe mode to the SD mode by controlling the SD host controller 24.

Thus, the operation mode of the memory card 3 can be automatically changed back to the SD mode without adding a special function to the PCIe/NVMe drivers to communicate with the host driver. Therefore, it is possible to cause the memory card 3 to operate in the SD mode without the user having to remove once and re-insert the memory card 3.

If some error (for example, an error in the PCIe interface circuit in the memory card 3 and the like) occurs in the PCIe/NVMe mode, the reset signal PERST #is usually asserted for a relatively long time. Here, by utilizing the phenomenon that the state of the reset signal PERST #being asserted continues for a long time, the SD host controller 24 detects the occurrence of an error in the PCIe/NVMe mode. During the initialization process of the PCIe interface or during memory access in the PCIe/NVMe mode, the PCIe driver controls the PCIe interface controller 231 to assert the reset signal PERST #for retry of a certain failed process. The period during which the reset signal PERST #is maintained in the assert state for retries is relatively short. In this embodiment, the SD host controller 24 is configured not to detect such a short reset for retry as an error.

More specifically, the SD host controller 24 detects that an error has occurred in the PCIe/NVMe mode, on the condition that a period of time during which both the card presence detection signal PRSNT #and the reset signal PERST #are asserted continues for a first period of time or longer. This error will as well be referred to a PCIe error hereinafter.

Errors that occur in the PCIe/NVMe mode (PCIe errors) include recoverable errors and unrecoverable errors. A recoverable error means an error in which even if an error related to a certain process occurs, the process will succeed after a predetermined number of retries. An unrecoverable error means an error in which the process will continue to fail even after a predetermined number of retries are executed. In the PCIe specification, unrecoverable errors are referred to as Fatal errors as well. Errors to be detected by the host controller 24 are unrecoverable errors in the PCIe/NVMe mode. The recoverable errors are excluded from the targets to be detected by the SD host controller 24.

The switch circuit 26 selects either the four data signal DAT [3:0] lines or the four PCIe signal lines (reset signal PERST #line, clock request signal CLKREQ #line, differential reference clock signals REFCLK-P and REFCLK-N lines), and connects between the selected signal lines and the DAT [3:0] terminal of the memory card 3.

When the operation mode of the memory card 3 is the SD mode, that is, when the second power supply voltage control signal VDD2-ON is low, the switch circuit 26 selects the four data signal DAT [3:0] lines and connects between the four data signal DAT [3:0] lines and the DAT [3:0] terminals of the memory card 3, respectively. When the operation mode of the memory card 3 is the PCIe/NVMe mode, that is, when the second power supply voltage control signal VDD2-ON is high, the switch circuit 26 selects the four PCIe signal lines (the reset signal PERST #line, clock request signal CLKREQ #line, differential reference clock signals REFCLK-P and REFCLK-N lines) and connects between the four PCIe signal lines and the DAT [3:0] terminals of the memory card 3, respectively.

Next, the interrupt signals generated by the SD host controller 24 will be described.

Factors that may cause the interrupt signal to be generated by the SD host controller 24 include "card insertion", "card removal" and "PCIe error" which means only unrecoverable errors.

When a "card insertion", "card removal" or "PCIe error" is detected, an interrupt signal to the CPU 21 is generated by the SD host controller 24. This interrupt signal is supplied to the CPU 21 via the interrupt controller 232.

The interrupt signal caused by the detection of the "card insertion", "card removal" or "PCIe error" is used to start the host driver. When the host driver is started by an interrupt signal, the host driver checks a status register to identify which interrupt is invoked and executes an interrupt process according to the factor of generating the interrupt signal ("card insertion", "card removal" or "PCIe error"). When the interrupt process is completed, the host driver can be put to the sleep state, and thus the CPU 21 is not used wastefully until the next interrupt is input.

When the host driver is started by an interrupt signal caused by a "PCIe error", the host driver executes a process of changing the operation mode of the memory card 3 from the PCIe/NVMe mode to the SD mode.

Thus, in this embodiment, when the occurrence of a "PCIe error" is detected by the SD host controller 24, an interrupt signal is generated by the SD host controller 24, thereby the host driver is started. Thus, even in an environment where the standard PCIe/NVMe drivers are used, the operation mode of the memory card 3 can be changed back to the SD mode.

Figure 2:
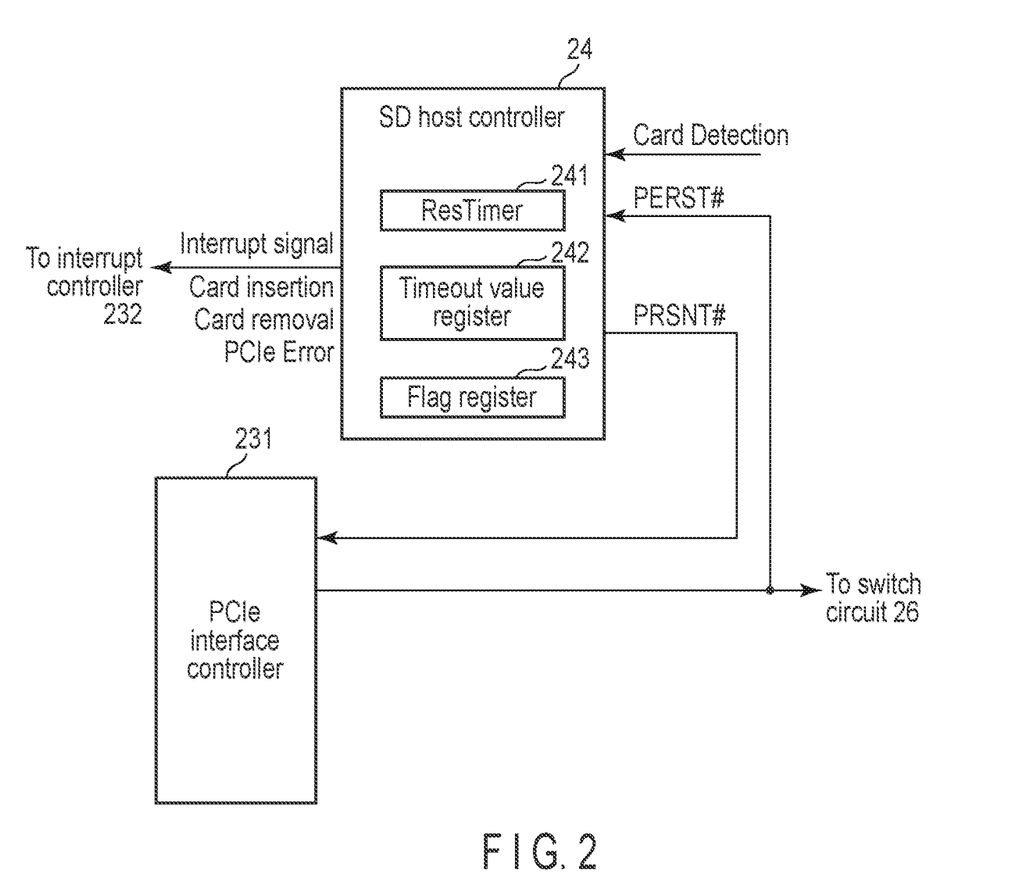
FIG. 2 is a block diagram illustrating a connection relationship between an SD host controller and a PCIe interface controller which are included in the host apparatus according to the embodiment.

FIG. 2 is a block diagram illustrating the connection relationship between the SD host controller 24 and the PCIe interface controller 231 which are included in the host apparatus 2 according to this embodiment.

The SD host controller 24 detects that a memory card 3 is inserted into the connector when it detects that the voltage level of the card detection signal Card Detection transmitted from the connector of the host apparatus 2 is changed from a high level to a low level, for example. In response to the detection of insertion of the memory card 3, the SD host controller 24 generates an interrupt signal ("card insertion" interruption) for starting the host driver. The interrupt signal is input to the CPU 21 via the interrupt controller 232.

The host driver starts-up the inserted memory card 3 in the SD mode and checks whether the memory card 3 supports the PCIe/NVMe mode or not. When the inserted memory card 3 supports the PCIe/NVMe mode, the host driver controls the SD host controller 24 to turn on VDD2 and to assert the card presence detection signal PRSNT #. When the card presence detection signal PRSNT #is asserted, the PCIe driver controls the PCIe interface controller 231 to initiate communication with the memory card 3 via the PCIe interface.

The SD host controller 24 detects that the memory card 3 is removed from the host apparatus 2 when the SD host controller 24 detects that the voltage level of the card detection signal Card Detection transmitted from the connector is changed from, for example, a low level to a high level. In response to this detection of the removal of the memory card 3, the SD host controller 24 generates an interrupt signal ("card removal" interruption) for starting the host driver. The host driver executes a process of turning off the card power (two power supply voltages VDD1 and VDD2), and the like.

The PCIe interface controller 231 asserts the reset signal PERST #for the PCIe/NVMe mode when an error occurs in the PCIe/NVMe mode. The SD host controller 24 monitors the reset signal PERST #for PCIe/NVMe mode, which is output from PCIe interface controller 231. When a period of time during which the card presence detection signal PRSNT #and the reset signal PERST #are simultaneously asserted continues for a certain period of time or more, the SD host controller 24 determines that an unrecoverable PCIe error has occurred and generates an interrupt signal ("PCIe error" interruption) for starting the host driver.

Thus, there are three types of factors that cause an interrupt signal to be generated by the SD host controller 24: "card insertion", "card removal" and "PCIe error".

The SD host controller 24 includes a status register (not shown) in which an interrupt status indicating the interrupt factor is stored. The host driver can identify whether the interrupt factor is "card insertion", "card removal" or "PCIe error" by reading the interrupt status from the status register in the SD host controller 24.

Next, the structural elements of the SD host controller 24 will now be described. The SD host controller 24 includes a reset timer (ResTimer) 241.

The Reset Timer (ResTimer) 241 measures the period of time during which both the card presence detection signal PRSNT #and the reset signal PERST #are being asserted.

The PCIe driver controls the PCIe interface controller 231 to assert the reset signal PERST #for the PCIe/NVMe mode once when retrying. In this case, the period during which the reset signal PERST #is maintained in the assert state (the active state=low level) is relatively short (a short reset). The period during which the reset signal PERST #is maintained in the assert state for retries is, for example, 1 second at maximum. The Reset Timer (ResTimer) 241 is used to exclude short resets for retries from the targets of detection.

The reset timer (ResTimer) 241 starts counting from an initial value (for example, zero) when the reset signal PERST #for PCIe/NVMe mode is asserted while the card presence detection signal PRSNT #directed toward the PCIe interface controller 231 is being asserted. When the reset signal PERST #is de-asserted while the card presence detection signal PRSNT #is being asserted, the counting operation by the reset timer (ResTimer) 241 is stopped. When the de-asserted reset signal PERST #is asserted again, the reset timer (ResTimer) 241 starts counting again from the initial value (from, zero).

The SD host controller 24 compares the count value of the reset timer (ResTimer) 241 and the timeout value stored in the timeout value register 242 of the SD host controller 24 with each other. The SD host controller 24 detects the occurrence of a PCIe error (unrecoverable error) in the PCIe/NVMe mode on the condition that the count value of the reset timer (ResTimer) 241 is the timeout value or more. In response to the detection of the occurrence of a PCIe error, the SD controller 24 starts the host driver by generating an interrupt signal.

In the interrupt process caused by the occurrence of a PCIe error (a PCIe error interrupt process), the host driver de-asserts the card presence detection signal PRSNT #and turns off the power supply voltage VDD2 by controlling the SD host controller 24, thereby changing the operation mode of the memory card 3 back to the SD mode. In this manner, it is possible to prevent the memory card 3 from freezing in the PCIe/NVMe mode, thus allowing the memory card 3 to be continuously used. The host driver can execute a process of notifying the user via the OS that a PCIe error has occurred in the PCIe/NVMe mode (warning).

The host driver can specify a timeout value to the SD host controller 24 by writing the timeout value to a timeout value register 242 in the SD host controller 24. Alternatively, the timeout value may be a predetermined fixed value.

Further, the SD host controller 24 maintains a flag (PCIe fatal error: PCIeFerr) indicating that a PCIe fatal error has occurred in the PCIe/NVMe mode. This flag (PCIeFerr) is stored in the flag register 243 in the SD host controller 24, for example.

"Flag (PCIeFerr)=0" indicates that no PCIe error has occurred (default value). "Flag (PCIeFerr)=1" indicates that an occurrence of a PCIe error has been detected. When a "card insert" event occurs, the flag (PCIeFerr) is cleared as the default value. Note that the flag (PCIeFerr) is maintained while power is being supplied to the host controller 24, but when the supply of the power to the host controller 24 is stopped, the flag (PCIeFerr) is not maintained. That is, the host controller 24 maintains the flag (PCIeFerr) representing the value (=1) that indicates the detection of the occurrence of a PCIe error as long as the power is being supplied to the host controller 24. The group of registers in the host controller 24 is volatile. Therefore, when the supply of the power to the host controller 24 is stopped, the content (=1) of the flag (PCIeFerr) stored in the flag register 243 is lost. The flag (PCIeFerr) is set to the default value (=0) indicating that no PCIe error has occurred at the next startup of the host controller 24. Note that not only when a "card insert" event occurs, but also when a "card removal" event occurs, the flag (PCIeFerr) can be cleared and set to its default value.

When the memory card 3 is re-initialized, the host driver reads the flag (PCIeFerr) from the flag register 243 of the SD host controller 24.

When the memory card 3 inserted in the connector supports PCIe/NVMe mode and the flag (PCIeFerr) is not set to "1", the host driver controls the SD host controller 24 such that the operation mode of the memory card 3 is changed from the SD mode to the PCIe/NVMe mode.

On the other hand, when the flag (PCIeFerr) is set to "1", the host driver controls the SD host controller 24 such that the memory card 3 operates in the SD mode, regardless of whether or not the memory card 3 inserted in the connector supports the PCIe/NVMe mode. In other words, even if the memory card 3 supports the PCIe/NVMe mode, the host driver controls the memory card 3 using the SD mode. Thus, it is possible to prevent the memory card 3 from starting to be used in the PCIe/NVMe mode and causing a PCIe error to occur again. Note that when the supply of the power to the host controller 24 is stopped, the content (=1) of the flag (PCIeFerr) stored in the flag register 243 is lost. Then, the flag (PCIeFerr) is set to the default value (=0) at the next startup of the host controller 24, indicating that no PCIe error has occurred. Therefore, if the memory card 3 is replaced with a new memory card that supports the PCIe/NVMe mode while the supply of the power to the host controller 24 is stopped, the host driver can control the SD host controller 24 such that the operation mode of the new memory card is changed from the SD mode to the PCIe/NVMe mode.

Figure 3:
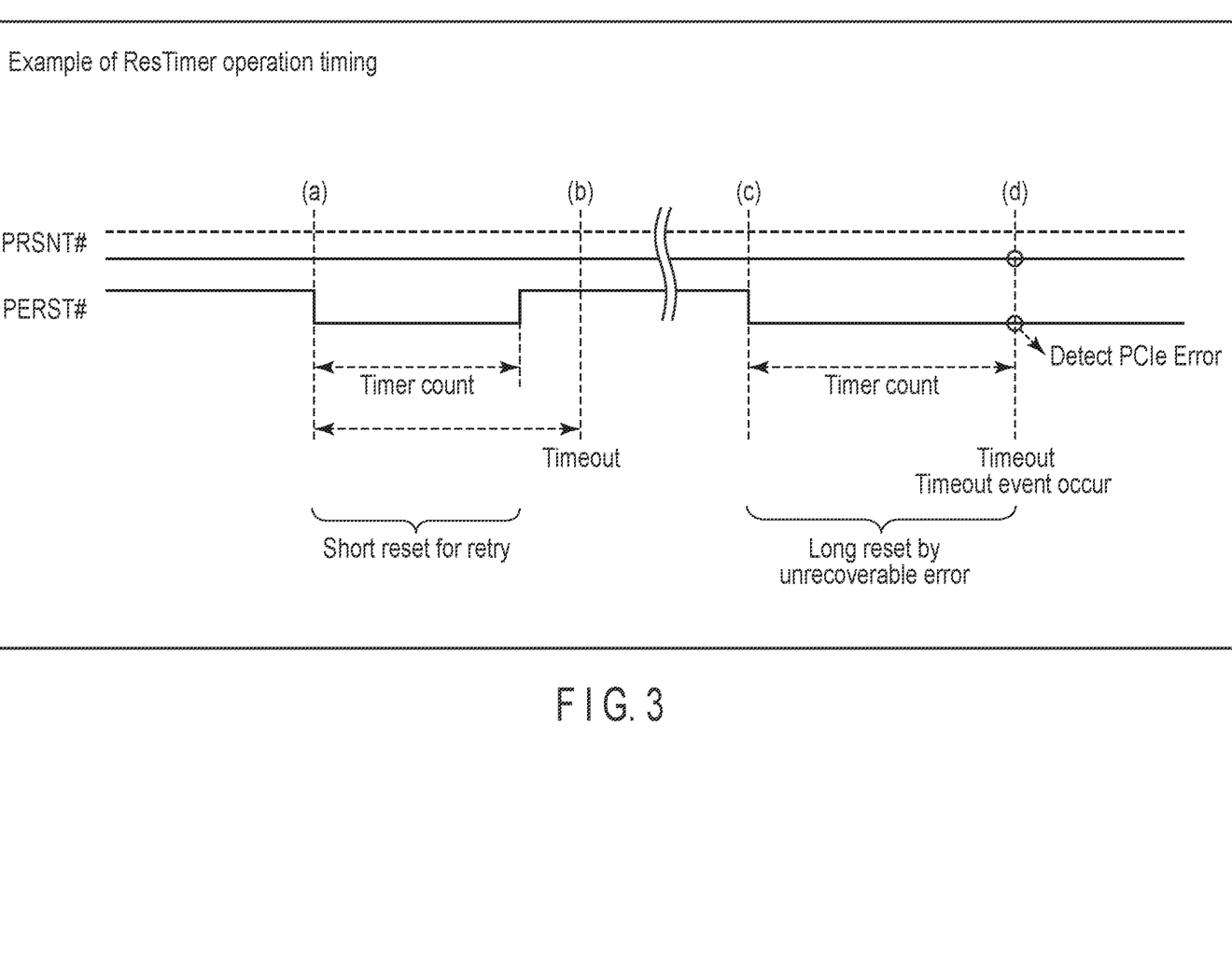
FIG. 3 is a diagram illustrating a timer count in a PCIe error detection process executed in the host apparatus according to the embodiment.

FIG. 3 is a diagram illustrating the timer count in the PCIe error detection executed in the host apparatus 2 according to the embodiment.

In FIG. 3, the horizontal axis represents time, with the upper region representing the card presence detection signal PRSNT #and the lower region representing the reset signal PERST #. The solid lines represent the voltage levels of the respective signals (card presence detection signal PRSNT #and reset signal PERST #) at a certain time.

The dashed line in the card presence detection signal PRSNT #represents a voltage level (high level). The high level of the card presence detection signal PRSNT #corresponds to a de-assert state of the card presence detection signal PRSNT #. A voltage level (low level) of the card presence detection signal PRSNT #corresponds to an assert state of the card presence detection signal PRSNT #. In FIG. 3, it is assumed that the memory card 3 is in the PCIe/NVMe mode. For this reason, the card presence detection signal PRSNT #is maintained in an assert state (low level) as shown in the solid line in the card presence detection signal PRSNT #.

In the case of the reset signal PERST #as well, a high level of the reset signal PERST #corresponds to a de-assert state of the reset signal PERST #, and a low level of the reset signal PERST #corresponds to an assert state of the reset signal PERST #. That is, the reset signal PERST #transitions from the de-assert state to the assert state at a timing (a) and a timing (c).

At each of the timings (a) and (c), when the reset signal PERST #transitions from the de-assert state to the assert state, the ResTimer 241 starts counting the elapsed time from the initial value (for example, 0). In the counting operation, the length of time that both the card presence detection PRSNT #signal and the reset signal PERST #are asserted is measured. The ResTimer 241 generates the timeout event when the count value of the elapsed time reaches the timeout value of the timeout value register 242.

The timing (b) indicates the point in time when the elapsed time from the timing (a) reaches the timeout value. As shown in FIG. 3, for example, when a short reset for retry occurs at the timing (a), the reset signal PERST #transitions from the assert state to the de-assert state before the timing (b). In this case, no timeout event occurs. Therefore, it is possible to prevent short resets for retry from being detected as PCIe errors (unrecoverable error) in the PCIe/NVMe mode.

The timing (d) indicates the point in time when the elapsed time from the timing (c) reaches the timeout value. As shown in FIG. 3, when a PCIe error (unrecoverable error) occurs in the PCIe/NVMe mode, the reset signal PERST #asserted at the timing (c) is maintained in the assert state while being at the timeout value or more. Thus, a timeout event occurs at the timing (d). On the condition that the timeout event occurs, the SD host controller 24 detects that a PCIe error (unrecoverable error) has occurred in the PCIe/NVMe mode.

Figure 4:
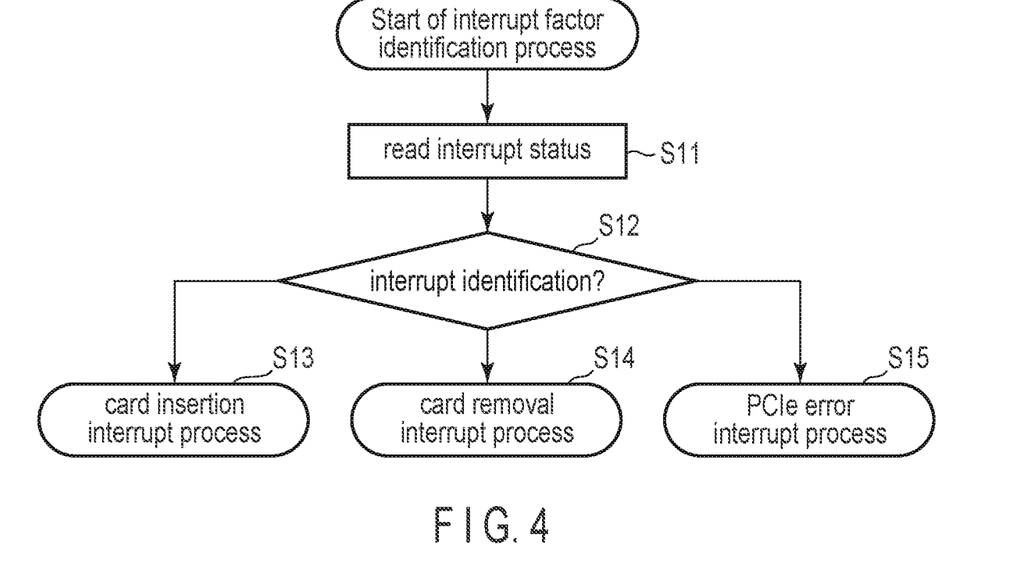
FIG. 4 is a flowchart illustrating a procedure of an interrupt factor identification process executed in the host apparatus according to the embodiment.

Next, the interrupt factor identification process executed in the host apparatus 2 will now be described. FIG. 4 is a flowchart showing a procedure of the interrupt factor identification process executed in the host apparatus 2 of the embodiment.

When an interrupt signal generated by the SD host controller 24 is input to the CPU 21 via the interrupt controller 232, the host driver is started by the CPU 21.

The host driver, first, reads the interrupt status stored in the status register in the SD host controller 24 (step S11), and then, based on the read interrupt status, identifies whether the factor of the generated interrupt signal is "card insertion", "card removal" or "PCIe error" (step S12).

When the factor of the generated interrupt signal is "card insertion", the host driver executes the card insertion interrupt process (step S13). In the insertion interrupt process of the memory card 3, the host driver once sets the operation mode of the memory card 3 to the SD mode, checks whether or not the memory card 3 supports the PCIe/NVMe mode using the CMD8, reads the flag (PCIeFerr) to check whether or not a PCIe error has occurred, and executes the initialization process of the SD mode or the process of changing the operation mode of the memory card 3 to the PCIe/NVMe mode, based on the results of these checks. The details of the card insertion interrupt process will be described later with reference to FIG. 6.

When the factor of the generated interrupt signal is "card removal", the host driver executes the card removal interrupt process. In the card removal interrupt processing, for example, the process of de-asserting the card presence detection signal PRSNT #, the process of turning off VDD1 and VDD2, and the like are executed.

When the factor of the generated interrupt signal is a "PCIe error", the host driver executes the PCIe error interrupt process. In the PCIe error interrupt process, the process of changing the operation mode of the memory card 3 from the PCIe/NVMe mode to the SD mode is executed.

Figure 5:
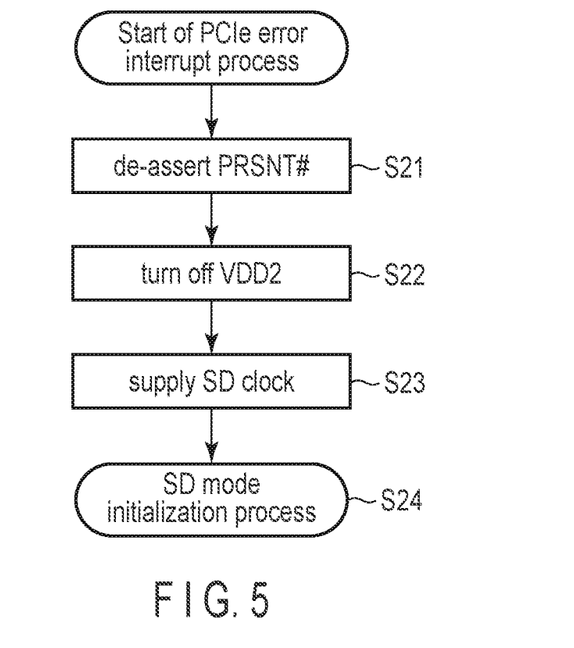
FIG. 5 is a flowchart illustrating a procedure of a PCIe error interrupt process executed in the host apparatus according to the embodiment.

FIG. 5 is a flowchart showing a procedure of the PCIe error interrupt processing executed in the host apparatus 2 according to the embodiment.

When the host driver is activated by the CPU 21 due to an interrupt signal caused by a "PCIe error", the host driver, first, controls the SD host controller 24 to cause the card presence detection signal PRSNT #to transition to the de-assert state (step S21). In response to the transition of the card presence detection signal PRSNT #from the assert state to the de-assert state, the connection between the PCIe interface controller 231 and the memory card 3 is released.

Next, the host driver controls the SD host controller 24 to turn off the second power supply voltage VDD2 (step S22). Next, the host driver controls the SD host controller 24 to start supplying the SD clock (SD CLK) to the memory card 3 (step S23). After the supply of the SD clock is started, the host driver starts the initialization process of the SD mode (step S24).

With this operation, when an error occurs during operation in the PCIe/NVMe mode and it is determined that the error is a PCIe error, an interrupt signal due to the PCIe error is transmitted from the SD host controller 24 to the system controller 231, thereby enabling the shifting from the PCIe/NVMe mode to the SD mode.

Figure 6:
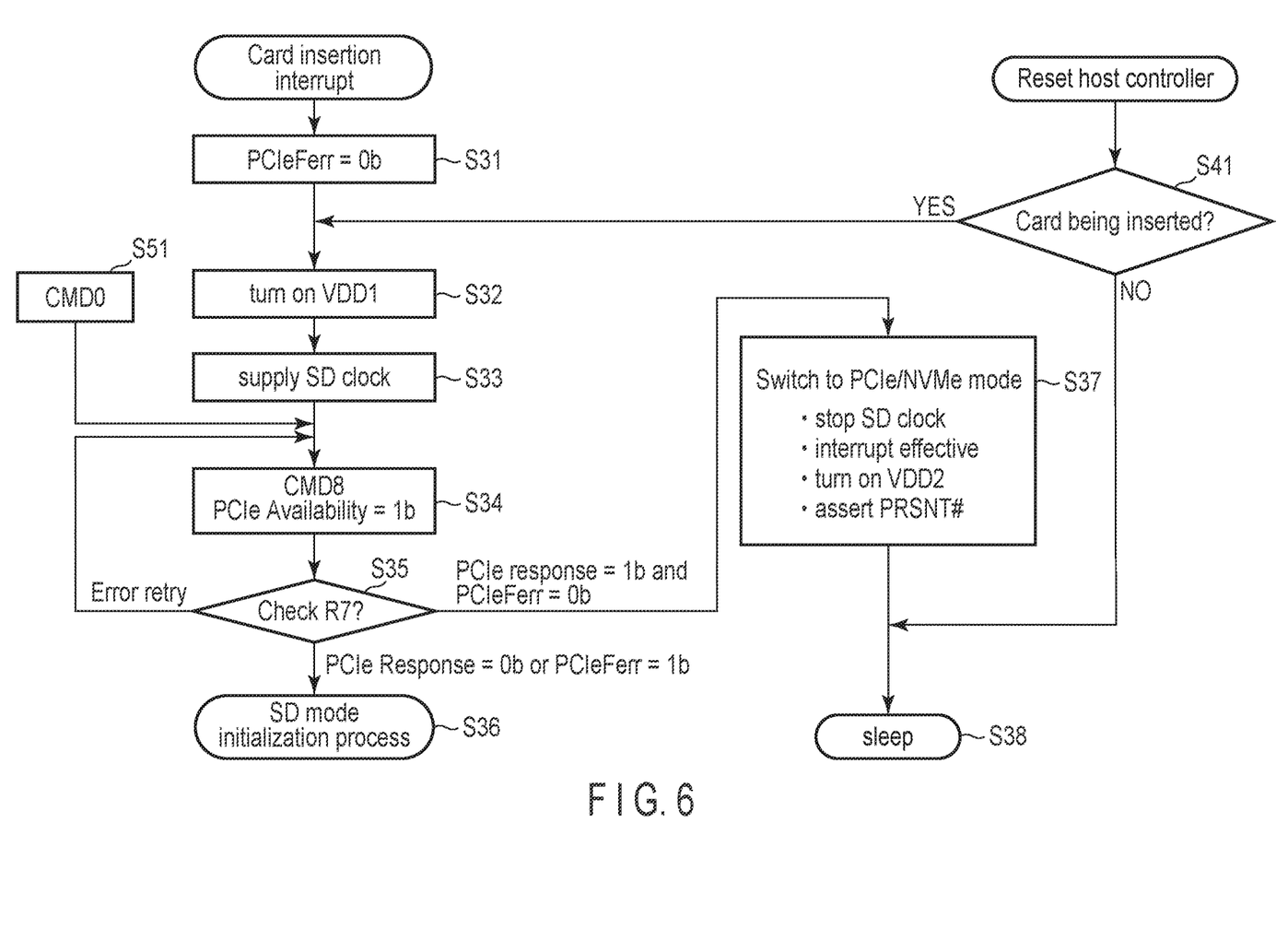
FIG. 6 is a flowchart illustrating a procedure of an operation mode switching process executed in the host apparatus according to the embodiment.

FIG. 6 is a flowchart showing a procedure of the operation mode switching process executed in the host apparatus 2 according to the embodiment.

Now, the card insertion interrupt process, which is executed when the host driver is started by the CPU 21 due to the generation of an interrupt signal caused by "card insertion" will be described.

First, the host driver controls the SD host controller 24 to clear the flag (PCIeFerr) stored in the flag register 243, thereby resetting the flag (PCIeFerr) to the default value (=0) which indicates that no PCIe error has occurred (step S31). The reason for resetting the flag (PCIeFerr) to the default value (initial value) is not to prevent the use of the PCIe/NVMe mode when a new memory card is inserted to the connector.

Next, the host driver controls the SD host controller 24 to turn on the first power supply voltage VDD1 (step S32). More specifically, the SD host controller 24 supplies the first power supply voltage control signal VDD1-ON for turning on the VDD1, to the power supply circuit 25. Then, the host driver controls the SD host controller 24 to supply the SD clock to the memory card 3 (step S33). Thus, the memory card 3 starts operating in the SD mode.

Subsequently, the host driver controls the SD host controller 24 to transmit to the memory card 3, the SD command "CMD8" in which the bit "PCIe Availability" for checking whether or not the memory card 3 supports the PCIe/NVMe mode is set to 1. The SD command "CMD8" is a command to query the memory card 3 about its capability. Upon receiving the SD command "CMD8", the memory card 3 returns to the SD host controller 24, a response "R7" containing the bit "PCIe Response" which indicates whether or not it supports the PCIe/NVMe mode.

"PCIe Response=1" indicates that memory card 3 supports the PCIe/NVMe mode. "PCIe Response=0" indicates that the memory card 3 does not support the PCIe/NVMe mode.

When failing to receive the response "R7" from the memory card 3 ("Error retry" in step S35), the host driver issues again to the memory card 3, the SD command "CMD8" in which the bit "PCIe Availability" is set to 1. The maximum number of retries to issue the SD command "CMD8" is determined according to the implementation of the host driver.

The host driver reads the bit "PCIe Response" contained in the response "R7" from the SD host controller 24, and further reads the flag (PCIeFerr) from the SD host controller 24.

Based on the read bit "PCIe Response" and the read flag (PCIeFerr), the host driver determines the operation mode to be used to control the memory card 3 (step S35).

When the memory card 3 does not support the PCIe/NVMe mode (PCIe Response=0) or when PCIeFerr=1, the host driver executes the initialization process of the SD mode (step S36). Thus, the memory card 3 in maintained in the SD mode.

On the other hand, when the memory card 3 supports the PCIe/NVMe mode (PCIe Response=1) and further PCIeFerr=0, the host driver controls the SD host controller 24 to execute switching to the PCIe/NVMe mode (step S37).

In step S37, the host driver controls the SD host controller 24 to stop the supply of the SD clock to the memory card 3. Further, the host driver controls the SD host controller 24 to enable generation of the interrupt signal caused by a "card insert" event, generation of the interrupt signal caused by a "card removal" event, and generation of the interrupt signal caused by a "PCIe error" event. Further, the host driver controls the SD host controller 24 to turn on VDD2 and controls the SD host controller 24 to assert the card presence detection signal PRSNT #. When the card presence detection signal PRSNT #is asserted, the PCIe interface controller 231 starts operating. Thus, the operation mode of the memory card 3 is changed to the PCIe/NVMe mode. Then, the host driver transitions to the sleep state (step S38).

When the host driver is started by a reset of the host controller 24, the host driver, first, checks the value of a specific register in the SD host controller 24, which indicates whether or not a memory card 3 has been inserted to the connector, thereby determining whether or not a memory card 3 has been inserted to the connector (step S41). When the power continues to be supplied to the host controller 24, the value of each register in the host controller 24 is retained. When the supply of the power to the host controller 24 is stopped, the value of each register is not retained. When the power is supplied to the host controller 24 again, the value of the specific register which indicates card detection status is set to "no memory card" status even a memory card 3 has been inserted to the connector and the value is set again to a value indicating "card inserted" status. The flag (PCIeFerr) which is stored in the flag register 243 in the host controller 24 continues to be maintained, when the power continues to be supplied to the host controller 24. The flag (PCIeFerr) representing a value (=1) indicates that the occurrence of a PCIe error has been detected. On the other hand, once the supply of the power to the host controller 24 is stopped, the flag (PCIeFerr) is set to the default value (initial value=0) which indicates that no PCIe error has occurred when power is supplied to the host controller 24 again. The reason why the flag (PCIeFerr) is set to the default value (=0) is that the memory card 3 may be replaced with another memory card while the supply of the power to the host controller 24 is stopped.

In order to enable the content (=1) of the flag (PCIeFerr) to be valid when the host controller 23 is reset, the host apparatus 2 may be configured to continue supplying power to at least the host controller 24. In this case, the content (=1) of the flag (PCIeFerr) is not lost. As long as the power is being supplied to the host controller 24, the card detection function of the host controller 24 functions effectively. Therefore, when the memory card 3 is replaced with a new memory card, the host controller 24 can detect the insertion of a new memory card and then can set the flag (PCIeFerr) to the default value (initial value=0) which indicates that no PCIe error has occurred.

If, after the occurrence of a PCIe error on the memory card 3 is detected, the host controller 24 is reset without the memory card 3 being replaced and further, the power is supplied to the host controller 24, the host driver can recognize the occurrence of a PCIe error via the flag (PCIeFerr) and therefore the host driver can keep the operation mode of the memory card 3 to the SD mode. Further, the host driver can notify the user of the occurrence of an error in the PCIe/NVMe mode.

Here, let us return to the explanation in FIG. 6. when determining that a memory card 3 has been inserted to the connector (YES in step S41), the host driver proceeds to the process of step S32.

The host driver controls the SD host controller 24 to turn on the first power supply voltage VDD1 (step S32). More specifically, the SD host controller 24 supplies to the power supply circuit 25 the first power supply voltage control signal VDD1-ON for turning on the VDD1. Then, the host driver controls the SD host controller 24 to supply the SD clock to the memory card 3 (step S33). As a result, the memory card 3 starts operating in the SD mode.

Subsequently, the host driver controls the SD host controller 24 to transmit to the memory card 3, the SD command "CMD8" in which the bit "PCIe Availability" is set to 1. The SD command "CMD8" is received, the memory card 3 returns to the SD host controller 24, the response "R7" including the bit "PCIe Response" which indicates whether or not the PCIe/NVMe mode is supported.

The host driver reads the bit "PCIe Response" included in the response "R7" from the SD host controller 24 and also reads the flag (PCIeFerr) from the SD host controller 24.

Based on the read bit "PCIe Response" and the read flag (PCIeFerr), the host driver determines the operation mode to be used to control the memory card 3 (step S35).

When the memory card 3 does not support the PCIe/NVMe mode (PCIe Response=0) or when PCIeFerr=1, the host driver executes the initialization process of the SD mode (step S36). Thus, the memory card 3 is maintained in the SD mode.

In other words, when PCIeFerr=1, the host driver controls the SD host controller 24 so as to cause the memory card 3 to operate in the SD mode regardless of whether or not the memory card 3 supports the PCIe/NVMe mode. That is, even if the memory card 3 supports the PCIe/NVMe mode, the host driver controls the memory card 3 using the SD mode. As a result, it is possible to prevent the reoccurrence of PCIe errors.

On the other hand, when the memory card 3 supports the PCIe/NVMe mode (PCIe Response=1) and further PCIeFerr=0, the host driver controls the SD host controller 24 to execute switching to the PCIe/NVMe mode (step S37). Then, the host driver transitions to the sleep state (Step S38).

On the other hand, if no memory card 3 has been inserted to the connector (NO in step S41), the host driver immediately transitions to the sleep state (step S38).

Note that when CMD0 is issued by the host driver (step S51), the processing from step S32 are executed.

As explained above, according to this embodiment, in the memory system 1 including a memory card 3 that is capable of operating in the PCIe/NVMe mode and SD mode and a host apparatus 2, the SD host controller 24, when the memory card 3 supports the PCIe/NVMe mode, turns on VDD2 while VDD1 is on and asserts the card presence detection signal PRSNT #, such that the operation mode of the memory card 3 is changed from the SD mode to the PCIe/NVMe mode. While the memory card 3 is in the PCIe/NVMe mode, the SD host controller 24 monitors the reset signal PERST #. When a period of time during which both the card presence detection signal PRSNT #and the reset signal PERST #are asserted continues for the first period of time or longer, the SD host controller 24 detects that an error (unrecoverable error) has occurred in the PCIe/NVMe mode, and the SD host controller 24 generates an interrupt signal for starting the host driver. The host driver is started due to this interrupt signal. Therefore, even in an environment where the standard PCIe/NVMe drivers are used, the operation mode of the memory card 3 can be changed back to the SD mode.

Note that this embodiment is described on the assumption that the memory card 3 is realized as an SD Express card, but the configuration of the host apparatus 2 in this embodiment can as well be applied to various types of memory cards that support the first operation mode of communicating with the host apparatus 2 via the first interface and the second operation mode of communicating with the host apparatus 2 via the second interface different from the first interface.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A host apparatus capable of controlling a memory card that supports a first operation mode of communicating with the host apparatus via a first interface and a second operation mode of communicating with the host apparatus via a second interface different from the first interface, the host apparatus comprising:

a host controller configured to control the memory card via the first interface under a control of a first driver, the first driver being a program executed by a processor in the host apparatus;

a power supply circuit capable of supplying to the memory card a first power supply voltage necessary for both the first operation mode and the second operation mode, and a second power supply voltage lower than the first power supply voltage and necessary only for the second operation mode; and a communication control circuit configured to initiate communication with the memory card via the second interface under a control of a second driver, in response to an assertion of a card presence signal, the second driver being a program executed by the processor, wherein the host controller is configured to:

when the memory card supports the second operation mode, turn on the second power supply voltage while the first power supply voltage is on and assert the card presence signal directed toward the communication control circuit, such that an operation mode of the memory card is changed from the first operation mode to the second operation mode;

while the operation mode of the memory card is in the second operation mode, monitor a reset signal for the second operation mode output from the communication control circuit;

detect that an error occurs in the second operation mode when a period of time during which both the card presence signal and the reset signal for the second operation mode are asserted continues for a first period of time or longer; and generate a first interrupt signal for starting the first driver in response to detection of occurrence of the error, and wherein the first driver is configured to be started by the first interrupt signal, and to change the operation mode of the memory card from the second operation mode to the first operation mode by controlling the host controller.

2. The host apparatus of claim 1, wherein
the host controller includes a timer configured to measure a period of time during which both the card presence signal and the reset signal are asserted, and the host controller is configured to detect occurrence of an error in the second operation mode when the period of time measured by the timer reaches the first period of time.

3. The host apparatus of claim 1, wherein
the first driver is configured to:
in response to the first interrupt signal,
de-assert the card presence signal by controlling the host controller;
turn off the second power supply voltage by controlling the host controller; and
execute an initialization process of the first operation mode by controlling the host controller.

4. The host apparatus of claim 1, wherein
the host controller is configured to maintain, while power is being supplied to the host controller, a flag that is set to a first value indicating occurrence of an error in the second operation mode,
once supply of the power to the host controller is stopped, the flag is set to an initial value indicating no occurrence of an error, and
the first driver is configured to:
when the host controller is reset, read the flag from the host controller;

when the memory card supports the second operation mode and the flag is not set to the first value, control the host controller such that the operation mode of the memory card is changed from the first operation mode to the second operation mode; and when the flag is being set to the first value, control the host controller such that the memory card operates in the first operation mode regardless of whether or not the memory card supports the second operation mode.

5. The host apparatus of claim 4, wherein the host controller is configured to generate, in response to a card detection signal indicating insertion of a memory card to a connector of the host apparatus, a second interrupt signal for starting the first driver, and the first driver is configured to be started by the second interrupt signal, and to reset the flag to the initial value indicating no error.

6. A memory system comprising a host apparatus and a memory card, the memory card being configured to operate in a first operation mode of communicating with the host apparatus via a first interface and in a second operation mode of communicating with the host apparatus via a second interface different from the first interface, and the host apparatus comprising:

a host controller configured to control the memory card via the first interface under a control of a first driver, the first driver being a program executed by a processor in the host apparatus;

a power supply circuit capable of supplying to the memory card, a first power supply voltage necessary for both the first operation mode and the second operation mode, and a second power supply voltage lower than the first power supply voltage and necessary only for the second operation mode; and a communication control circuit configured to initiate communication with the memory card via the second interface under a control of a second driver, in response to an assertion of a card presence signal, the second driver being a program executed by the processor, wherein the host controller is configured to:

when the memory card supports the second operation mode, turn on the second power supply voltage while the first power supply voltage is on and assert the card presence signal directed toward the communication control circuit, such that an operation mode of the memory card is changed from the first operation mode to the second operation mode;

while the memory card is in the second operation mode, monitor a reset signal for the second operation mode output from the communication control circuit;

detect occurrence of an error in the second operation mode when a period of time during which both the card presence signal and the reset signal for the second operation mode are asserted continues for a first period of time or longer; and generate a first interrupt signal for starting the first driver in response to the detection of the occurrence of the error, and wherein the first driver is configured to change, when activated by the processor due to the first interrupt signal, the operation mode of the memory card from the second operation mode to the first operation mode by controlling the host controller.

7. The memory system of claim 6, wherein the host controller includes a timer configured to measure a period of time during which both the card presence signal and the reset signal are asserted, and the host controller is configured to detect occurrence of an error in the second operation mode when the period of time measured by the timer reaches the first period of time.

8. The memory system of claim 6, wherein the first driver is configured to:

in response to the first interrupt signal, de-assert the card presence signal by controlling the host controller;

turn off the second power supply voltage by controlling the host controller; and execute an initialization process of the first operation mode by controlling the host controller.

9. The memory system of claim 7, wherein the host controller is configured to maintain, while power is being supplied to the host controller, a flag that is set to a first value indicating occurrence of an error in the second operation mode, once supply of the power to the host controller is stopped, the flag is set to an initial value indicating no occurrence of an error, and the first driver is configured to:

when the host controller is reset, read the flag from the host controller;

when the memory card supports the second operation mode and the flag is not set to the first value, control the host controller such that the operation mode of the memory card is changed from the first operation mode to the second operation mode; and when the flag is being set to the first value, control the host controller such that the memory card operates in the first operation mode regardless of whether or not the memory card supports the second operation mode.

10. The memory system of claim 9, wherein the host controller is configured to generate, in response to a card detection signal indicating insertion of a memory card to a connector of the host apparatus, a second interrupt signal for starting the first driver, and the first driver is configured to be started by the second interrupt signal, and to reset the flag to the initial value indicating no error.

* * * * *